US009439340B2

(12) United States Patent
Sudbrink et al.

(10) Patent No.: US 9,439,340 B2
(45) Date of Patent: Sep. 13, 2016

(54) FRAME CONFIGURATION FOR AN AGRICULTURAL TILLAGE IMPLEMENT

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 38 days.

(21) Appl. No.: 14/520,698

(22) Filed: Oct. 22, 2014

(65) Prior Publication Data

US 2015/0129261 A1 May 14, 2015

Related U.S. Application Data

(60) Provisional application No. 61/903,483, filed on Nov. 13, 2013.

(51) Int. Cl.
*A01B 49/02* (2006.01)
*A01B 59/042* (2006.01)
*A01B 51/04* (2006.01)
*A01B 61/02* (2006.01)

(52) U.S. Cl.
CPC ............ *A01B 59/042* (2013.01); *A01B 49/02* (2013.01); *A01B 51/04* (2013.01); *A01B 61/02* (2013.01)

(58) Field of Classification Search
CPC ...... A01B 5/04; A01B 29/048; A01B 49/02; A01B 49/027; A01B 73/04; A01B 73/044; A01B 73/067; A01B 51/04; A01B 59/042; A01B 61/02

USPC ............ 111/54, 57; 172/170, 311, 456, 553, 172/579
See application file for complete search history.

(56) References Cited

U.S. PATENT DOCUMENTS

| 2,828,680 | A | | 4/1958 | Johnson |
| 3,588,139 | A | | 6/1971 | Bayne |
| 4,320,805 | A | | 3/1982 | Winter |
| 4,878,543 | A | | 11/1989 | Kauss |
| 4,993,499 | A | * | 2/1991 | Bourgault ............ A01B 73/044 172/294 |
| 5,957,218 | A | | 9/1999 | Noonan et al. |
| 6,068,062 | A | * | 5/2000 | Brueggen ............ A01B 73/044 172/311 |
| 6,144,910 | A | | 11/2000 | Scarlett et al. |

(Continued)

FOREIGN PATENT DOCUMENTS

| CA | 2 289 240 A1 | 5/2000 |
| FR | 2 651 957 A1 | 9/1989 |

*Primary Examiner* — Robert Pezzuto
(74) *Attorney, Agent, or Firm* — Rebecca L. Henkel

(57) ABSTRACT

An agricultural tillage implement includes a center frame section having a front frame member extending transverse to a travel direction, a rear frame member extending transverse to the travel direction, and a plurality of longitudinal frame members extending from and attached between the front frame member and the rear frame member. The plurality of longitudinal frame members include a pair of side frame members positioned at respective sides of the center frame section, and a pair of load distribution frame members. A plurality of tillage implements extend downwardly from the center frame section. A pull hitch is directly attached to the front frame member at two attachment locations and extends forward from the center frame section in the travel direction. Each attachment location is aligned with a respective load distribution frame member.

17 Claims, 4 Drawing Sheets

(56) References Cited

U.S. PATENT DOCUMENTS

| | | |
|---|---|---|
| 6,220,366 B1 | 4/2001 | Noonan et al. |
| 6,263,977 B1 | 7/2001 | Mayerle et al. |
| 6,269,887 B1 | 8/2001 | Friggstad |
| 6,305,478 B1 | 10/2001 | Friggstad |
| 6,374,923 B1 | 4/2002 | Friggstad |
| 6,547,012 B2 | 4/2003 | Scarlett et al. |
| 6,550,543 B1 | 4/2003 | Friggstad |
| 6,761,228 B2 * | 7/2004 | Dobson ................ A01B 73/04 111/54 |
| 7,142,956 B2 | 11/2006 | Heiniger et al. |
| 7,581,597 B2 * | 9/2009 | Neudorf ............... A01B 73/067 172/1 |
| 7,766,093 B2 | 8/2010 | Becker et al. |
| 7,926,247 B2 | 4/2011 | Van Den Engel |
| 8,074,729 B2 * | 12/2011 | Kovach ................ A01B 49/02 172/170 |
| 8,118,110 B2 | 2/2012 | Tamm et al. |
| 8,342,256 B2 | 1/2013 | Adams et al. |
| 8,352,121 B2 | 1/2013 | Bitter |
| 8,359,988 B2 | 1/2013 | Bassett |
| 2004/0016556 A1 | 1/2004 | Barber |
| 2006/0021235 A1 | 2/2006 | Becker |
| 2007/0068238 A1 | 3/2007 | Wendte |
| 2008/0267719 A1 | 10/2008 | Corcoran |
| 2012/0048159 A1 | 3/2012 | Adams et al. |
| 2012/0048160 A1 | 3/2012 | Adams et al. |
| 2012/0215410 A1 | 8/2012 | McClure et al. |
| 2012/0305321 A1 | 12/2012 | Wagger |
| 2013/0032363 A1 | 2/2013 | Curry et al. |

\* cited by examiner

FRAME CONFIGURATION FOR AN AGRICULTURAL TILLAGE IMPLEMENT

CROSS REFERENCE TO RELATED APPLICATIONS

This is a non-provisional application based upon U.S. provisional patent application Ser. No. 61/903,483, entitled "FRAME CONFIGURATION FOR AN ARGICULTURAL TILLAGE IMPLEMENT", filed Nov. 13, 2013, which is incorporated herein by reference.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements may include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof. Such rear auxiliary implements place an additional loading on the frame of the tillage implement to which they are attached.

What is needed in the art is an agricultural tillage implement with a rear auxiliary implement, which does not place undue loading on the frame of the tillage implement.

SUMMARY OF THE INVENTION

The present invention provides a field cultivator which has a center frame section with load transfer frame members which transfer loads caused by rear auxiliary implements directly to the pull hitch.

The invention in one form is directed to an agricultural tillage implement including a center frame section having a front frame member extending transverse to a travel direction, a rear frame member extending transverse to the travel direction, and a plurality of longitudinal frame members extending from and attached between the front frame member and the rear frame member. A plurality of tillage implements extend downwardly from the center frame section. A pull hitch is directly attached to the front frame member and extends forward from the center frame section in the travel direction.

The invention in another form is directed to an agricultural tillage implement including a center frame section having a front frame member extending transverse to a travel direction, a rear frame member extending transverse to the travel direction, and a plurality of longitudinal frame members extending from and attached between the front frame member and the rear frame member. The plurality of longitudinal frame members include a pair of side frame members positioned at respective sides of the center frame section, and a pair of load distribution frame members. A plurality of tillage implements extend downwardly from the center frame section. A pull hitch is directly attached to the front frame member at two attachment locations and extends forward from the center frame section in the travel direction. Each attachment location is aligned with a respective load distribution frame member.

An advantage of the present invention is that additional loads caused by rear auxiliary implements are transferred directly to the pull hitch.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
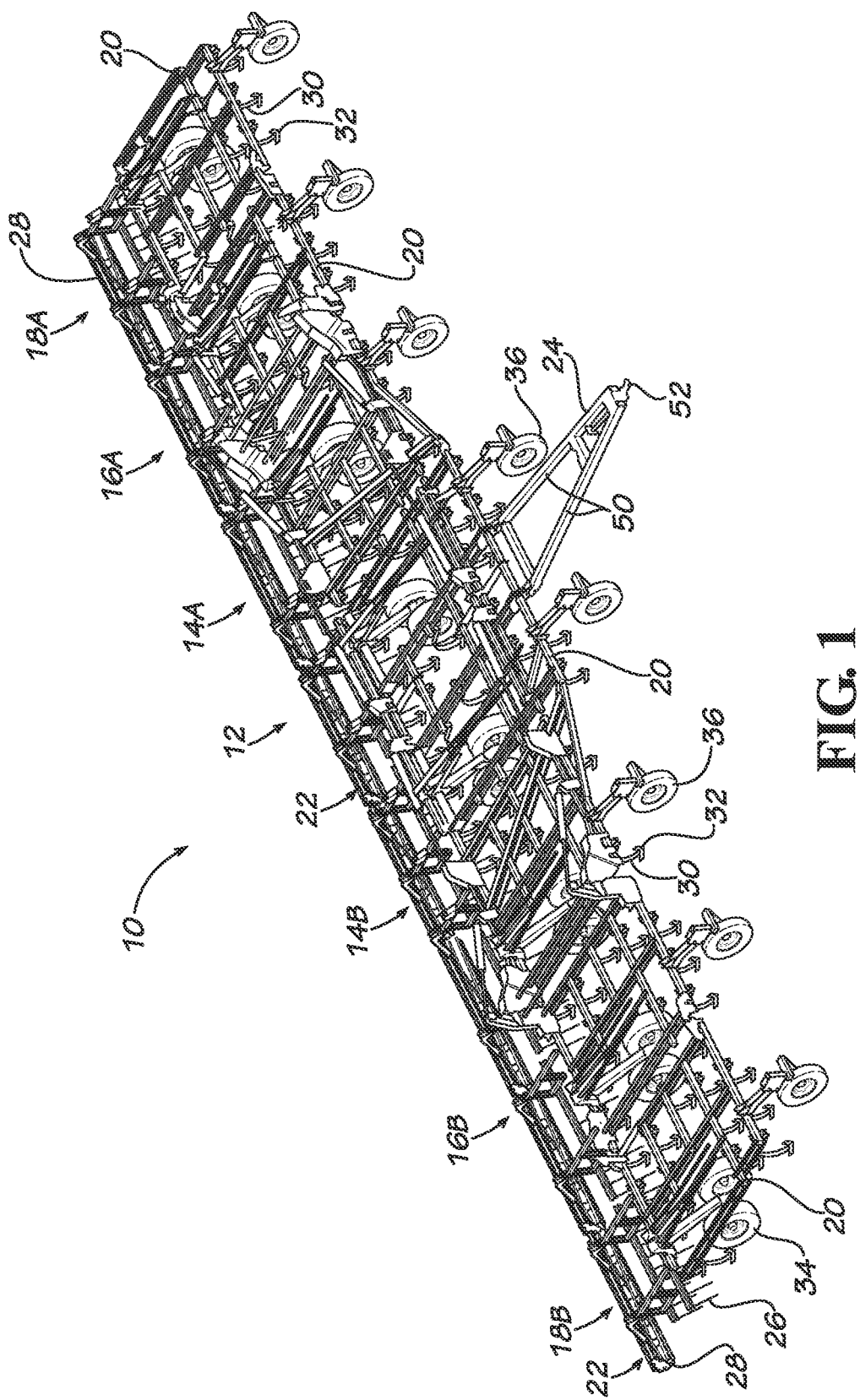
FIG. 1 is a top perspective view of an embodiment of an agricultural tillage implement of the present invention, in the form of a field cultivator, in an unfolded position.

Referring now to the drawings, and more particularly to FIG. 1, there is shown an embodiment of an agricultural implement of the present invention. In the illustrated embodiment, the agricultural implement is in the form of a field cultivator 10 for tilling and finishing soil prior to seeding. However, the present invention may be used with other types of agricultural tillage implements.

Field cultivator 10 is configured as a multi-section field cultivator, and includes a center frame section 12 and a plurality of wing sections 14, 16 and 18. In the illustrated embodiment, field cultivator 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections Inner wings sections 14A and 14B are each pivotally coupled with the left and right sides, respectively, of center frame section 12. Middle wings sections 16A and 16B are each pivotally coupled with the laterally outboard left and right sides, respectively, of inner wings sections 14A and 14B. Outer wings sections 18A and 18B are each pivotally coupled with the laterally outboard left and right sides, respectively, of middle wings sections 16A and 14B.

Center frame section 12 is the center section that is directly towed by a traction unit, such as an agricultural tractor (not shown). Center frame section 12 generally functions to carry a shank frame 20 for tilling the soil, and a rear auxiliary implement 22 for finishing the soil. A pull hitch 24 is attached to and extends forward from center frame section 12, and is coupled with the traction unit in known manner.

Figure 2:
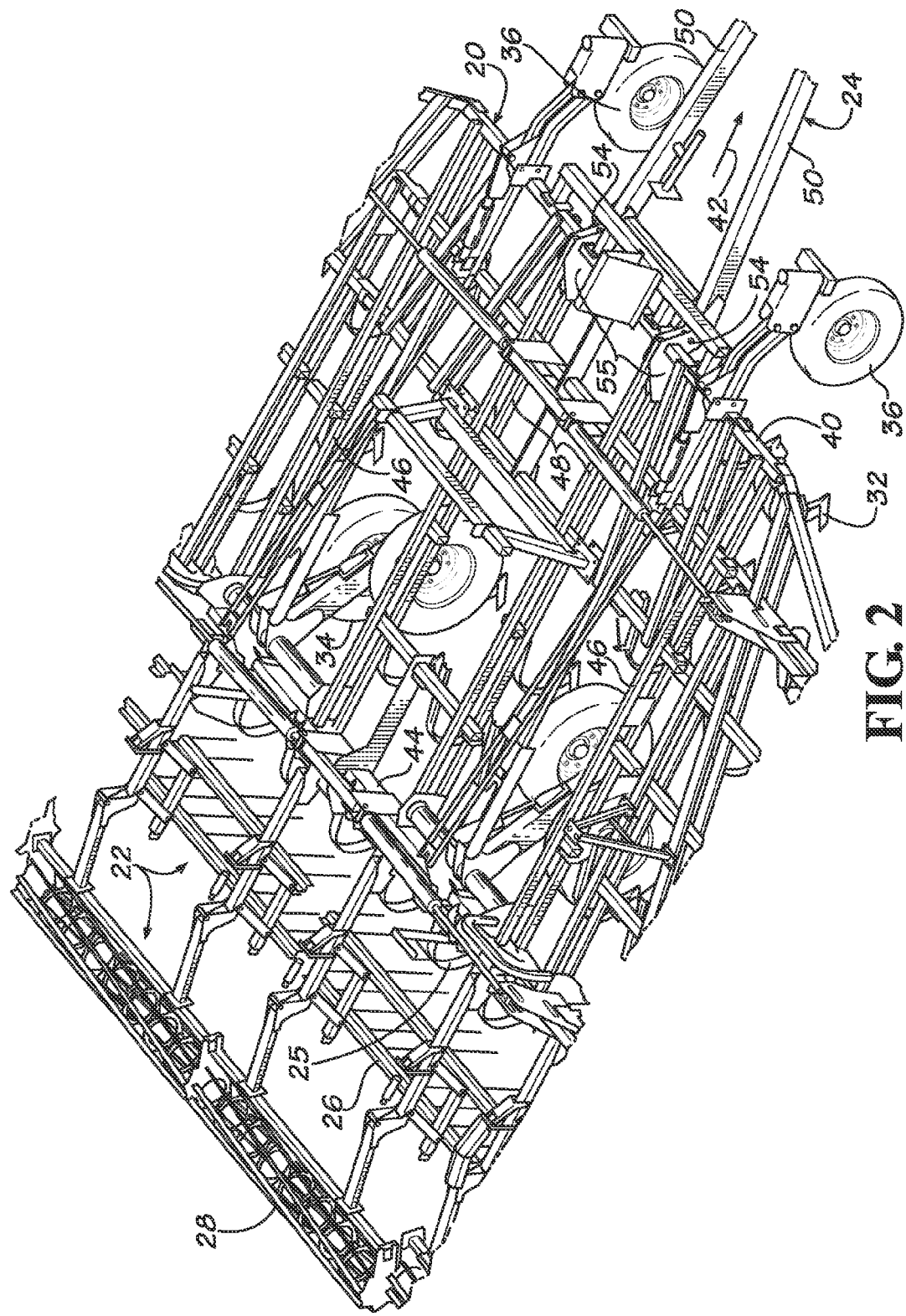
FIG. 2 is a fragmentary top perspective view of the field cultivator shown in FIG. 1.
Figure 3:
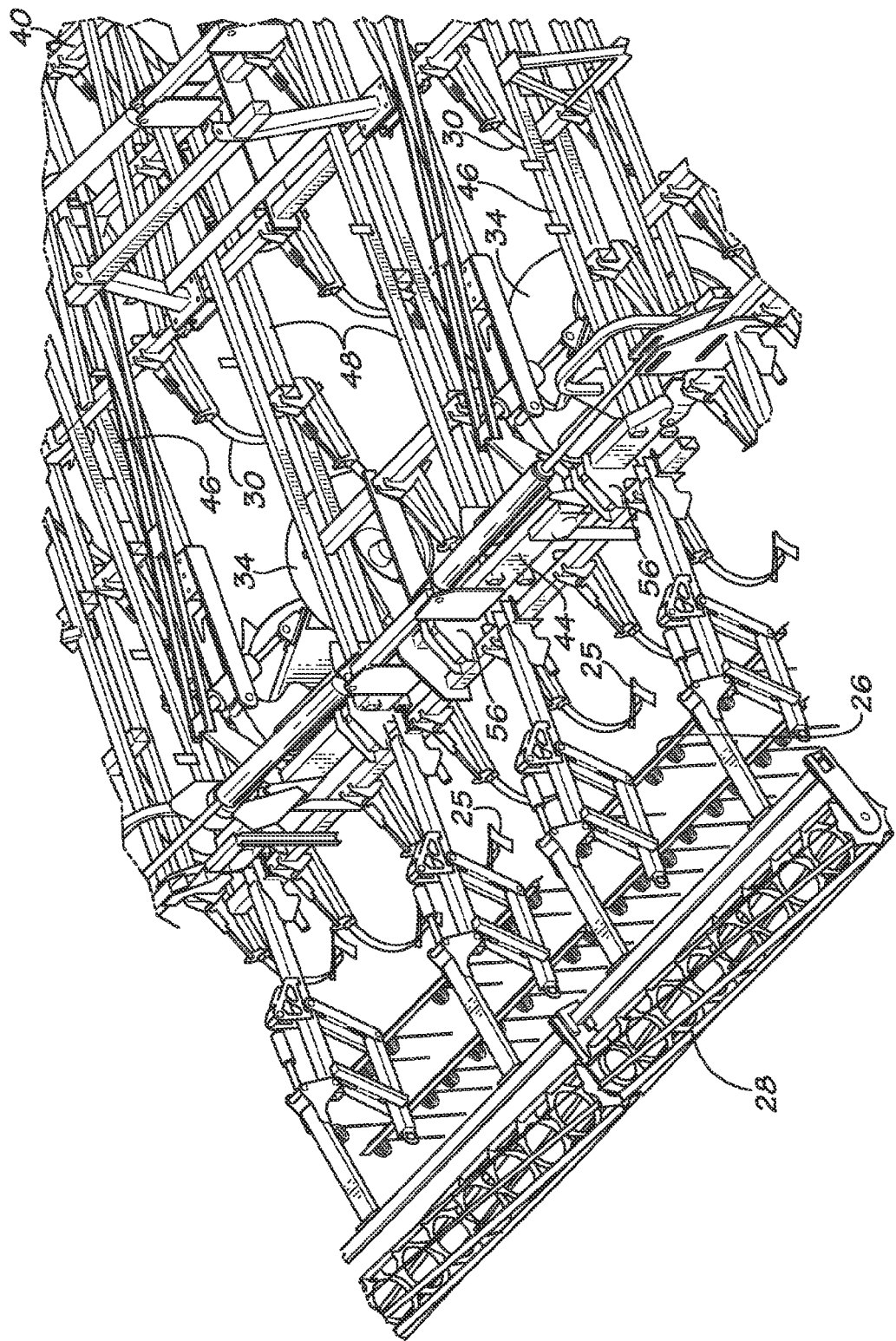
FIG. 3 is a rear fragmentary top perspective view of the field cultivator shown in FIG. 1.

Rear auxiliary implement 22 includes cultivator shovels 25, a spring tooth drag 26 and a rolling (aka, crumbler) basket 28 which coact with each other to finish the soil (FIGS. 2 and 3). However, rear auxiliary implement 22 can be differently configured, such as a spike tooth drag, etc.

Shank frame 20 generally functions to carry tillage implements which are attached to and extend downwardly from the shank frame 20. In the illustrated embodiment, the tillage implements are in the form of cultivator shanks 30 with shovels 32 at their lower ends for tilling the soil. Rear lift wheels 34 are used for raising and lowering the shank frame 20 with a hydraulic lift cylinder (not specifically visible in FIGS. 1 and 2), and a pair of front gauge wheels 36 are used to level the shank frame 20 during a field operation.

Similarly, each inner wing section 14A and 14B, middle wing section 16A and 16B, and outer wing section 18A and 18B includes a shank frame 20 for tilling the soil, a rear auxiliary implement 22 for finishing the soil, rear lift wheels 34 and front gauge wheels 36. These components are slightly different from but still similar to the like-named components described above with regard to center frame section 12, and are not described in further detail herein.

Figure 4:
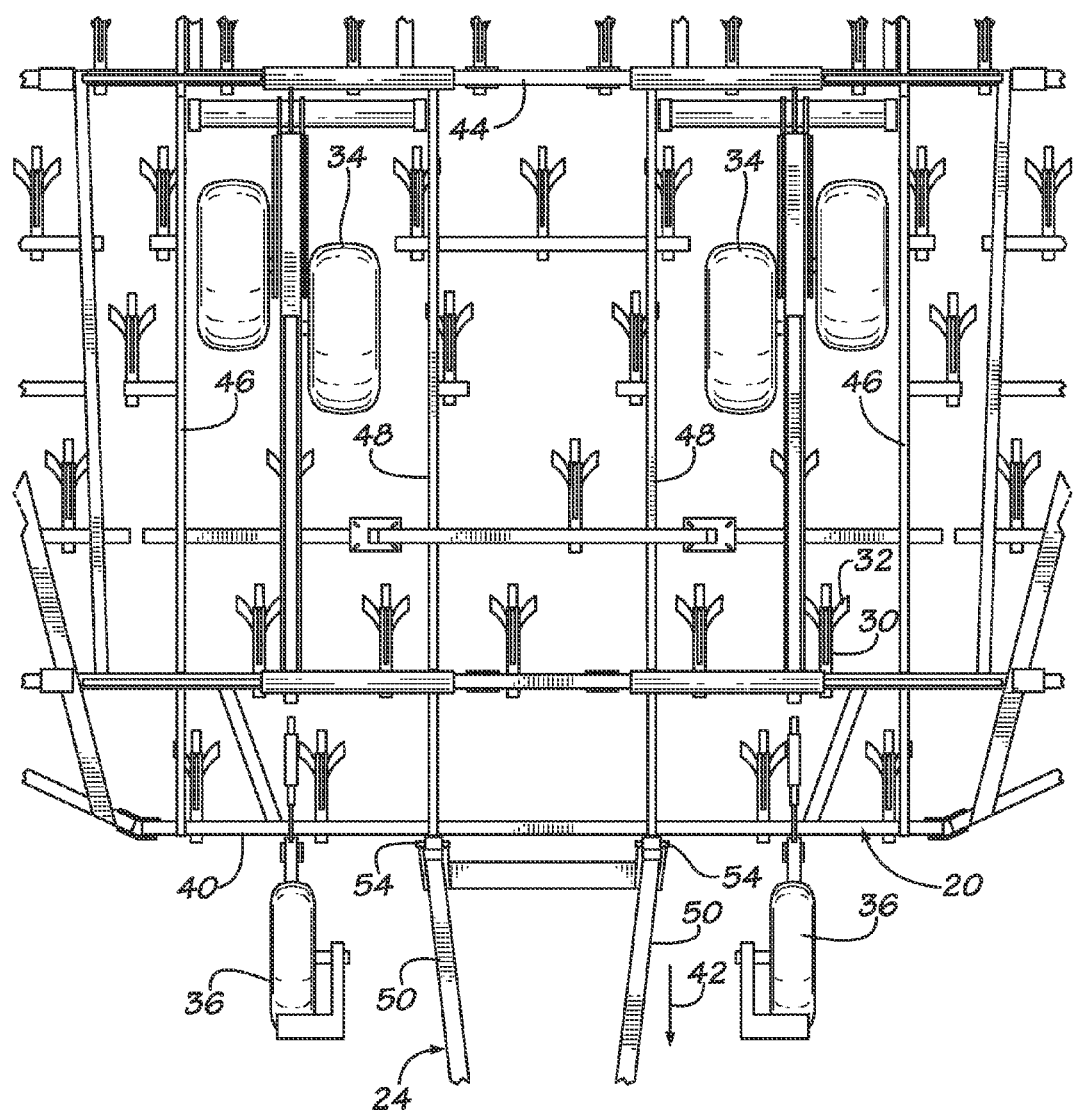
FIG. 4 is a top fragmentary view of the field cultivator shown in FIG. 1, showing the center frame section and part of the inner wings sections.

According to an aspect of the present invention, center frame section 12 is configured to directly transfer loads from rear auxiliary implement 22 to pull hitch 24. Referring to FIGS. 2-4, center frame section 12 includes a front frame member 40 extending transverse to a travel direction 42, a rear frame member 44 extending transverse to travel direction 42, and a plurality of longitudinal frame members 46 and 48 extending from and attached between front frame member 40 and rear frame member 44. In the embodiment shown, the plurality of longitudinal frame members 46, 48 include a pair of side frame members 46 positioned at respective sides of center frame section 12, and a pair of load distribution frame members 48 positioned laterally inward from the side frame members 46.

Pull hitch 24 includes a pair of side rails 50 which are each directly coupled with front frame member 40, and terminate at their forward ends at an apex which carries a clevis or other suitable attachment 52 for coupling with a traction unit. Each side rail 50 of pull hitch 24 can be pivotally coupled with front frame member 36 at respective attachment locations 54. The rear ends of side rails 50 are aligned (left to right) with the respective load distribution frame members 48 such that any loads from rear auxiliary implements 22 are transferred by way of load distribution frame members 48 directly to pull hitch 24. Brackets 55 can also optionally be used to directly couple the forward ends of load distribution frame members 48 with the rear ends of side rails 50, and thereby transfer any loads through load distribution frame members 48 to pull hitch 24.

Mounting brackets 56 interconnect rear auxiliary implements 22 with rear frame member 44 of center frame section 12 (FIG. 3). To assist with the transfer of loads from the rear auxiliary implements 22 directly to pull hitch 24, four mounting brackets 56 are spaced apart across the rear end of rear frame member 44. The majority of the loads from rear auxiliary implements 22 are transferred through load distribution frame members 48 to pull hitch 24. However, some of the loads from rear auxiliary implements 22 are also transferred through side frame members 46 to front frame member 40, then to pull hitch 24.

In the embodiment shown in the drawings, mounting brackets 56 are not positioned in transverse alignment (left to right) with side frame members 46 and load distribution frame members 48. However, depending on the configuration of center frame section 12, it may be desirable to position mounting brackets 56 in transverse alignment with side frame members 46 and load distribution frame members 48, thereby assisting in transferring the loads from rear auxiliary implement 22 directly to side frame members 46 and load distribution frame members 48.

In a field mode, the working depth of cultivator shanks 30 and shovels 32 is set using rear lift wheels 34. The rear auxiliary implements 22 can optionally be placed in a working position with the spring tooth drags 26 and rolling baskets 28 contacting and finishing the soil. With rear auxiliary implements 22 in the working or field position, additional loads are transferred through mounting brackets 56 to the rear frame member 44. Load distribution frame members 48 transfer the loads directly from rear frame member 44 to the pull hitch 24. Side frame members 46 transfer the loads from the rear frame member 44 to the front frame member 40, and then the loads are transferred through front frame member 40 to pull hitch 24.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a center frame section including a front frame member extending transverse to a travel direction, a rear frame member extending transverse to the travel direction, and a plurality of longitudinal frame members extending from and attached between said front frame member and said rear frame member;
   a plurality of tillage implements extending downwardly from said center frame section; and
   a pull hitch directly attached to said front frame member and extending forward from said center frame section in the travel direction.

2. The agricultural implement of claim 1, wherein said pull hitch is attached to said front frame member at two attachment locations, and wherein said plurality of longitudinal frame members include a pair of side frame members positioned at respective sides of said center frame section, and a pair of load distribution frame members each having one end which is aligned with a respective said attachment location.

3. The agricultural implement of claim 2, wherein said pull hitch is pivotally attached to said front frame member at said two attachment locations.

4. The agricultural implement of claim 1, further including a rear auxiliary tillage implement directly attached to said rear frame member.

5. The agricultural implement of claim 1, further including a plurality of wing sections, including at least one left wing section pivotally coupled with a left side of said center frame section and at least one right wing section pivotally coupled with a right side of said center frame section.

6. The agricultural implement of claim 5, wherein said center frame section includes a rear auxiliary tillage implement directly attached to said rear frame member, and each of said plurality of wing sections includes a rear auxiliary tillage implement.

7. The agricultural implement of claim 6, wherein each said rear auxiliary tillage implement includes a multi-teeth drag and a rolling basket.

8. The agricultural implement of claim 6, wherein each said rear auxiliary tillage implement includes a plurality of mounting brackets which are attached to said rear frame member.

9. The agricultural implement of claim 1, wherein said agricultural tillage implement is a field cultivator.

10. An agricultural tillage implement, comprising:
a center frame section including a front frame member extending transverse to a travel direction, a rear frame member extending transverse to the travel direction, and a plurality of longitudinal frame members extending from and attached between said front frame member and said rear frame member, said plurality of longitudinal frame members including a pair of side frame members positioned at respective sides of said center frame section, and a pair of load distribution frame members;
a plurality of tillage implements extending downwardly from said center frame section; and
a pull hitch directly attached to said front frame member at two attachment locations and extending forward from said center frame section in the travel direction, each said attachment location being aligned with a respective said load distribution frame member.

11. The agricultural implement of claim 10, wherein said center frame section includes a rear auxiliary tillage implement directly attached to said rear frame member.

12. The agricultural implement of claim 10, wherein said pull hitch is pivotally attached to said front frame member at said two attachment locations.

13. The agricultural implement of claim 10, further including a plurality of wing sections, including at least one left wing section pivotally coupled with a left side of said center frame section and at least one right wing section pivotally coupled with a right side of said center frame section.

14. The agricultural implement of claim 13, wherein said center frame section includes a rear auxiliary tillage implement directly attached to said rear frame member, and each of said plurality of wing sections includes a rear auxiliary tillage implement.

15. The agricultural implement of claim 14, wherein each said rear auxiliary tillage implement includes a multi-teeth drag and a rolling basket.

16. The agricultural implement of claim 14, wherein each said rear auxiliary tillage implement includes a plurality of mounting brackets which are attached to said rear frame member.

17. The agricultural implement of claim 10, wherein said agricultural tillage implement is a field cultivator.

* * * * *